(12) United States Patent
Waters Scheuer et al.

(10) Patent No.: US 6,277,045 B1
(45) Date of Patent: Aug. 21, 2001

(54) THIN PROFILE CAM SPROCKET WITH INTEGRATED TIMING TARGET

(75) Inventors: Nicole M. Waters Scheuer, Utica; Mahlon C. Smith, IV, Milford; Valentin I. Kavnatsky, West Bloomfield; Robert B. Deady, Plymouth; Steven S. Filipovski, Canton, all of MI (US); Reinhard Koch, Wachenroth (DE); Barry Kline, DuBois, PA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/456,803

(22) Filed: Dec. 8, 1999

(51) Int. Cl.7 ................................................. F16H 55/30
(52) U.S. Cl. ........................ 474/152; 474/160; 474/156
(58) Field of Search ................................. 474/150, 151, 474/152, 153, 154, 155, 156, 157, 158, 159, 160

(56) References Cited

U.S. PATENT DOCUMENTS

| | | | |
|---|---|---|---|
| 3,103,209 | * 9/1963 | Bekkala et al. | 123/65 |
| 4,457,269 | * 7/1984 | Beardmore | 123/90.31 |
| 5,209,202 | * 5/1993 | Maurer et al. | 123/414 |
| 6,090,320 | * 7/2000 | Grundner et al. | 264/113 |
| 6,138,623 | * 10/2000 | Heer | 123/90.17 |

\* cited by examiner

*Primary Examiner*—David A. Bucci
*Assistant Examiner*—Vicky A. Johnson
(74) *Attorney, Agent, or Firm*—Mark P. Calcaterra

(57) ABSTRACT

In an internal combustion engine, a shaft driving apparatus and timing assembly in the form of a camshaft sprocket having first and second ends extending perpendicular to the axis of rotation. The first end for defining an annular timing surface positioned adjacent an angular position sensor and including a first arcuate surface region extending outwardly in the axial direction from the sprocket's first end and a second surface arcuate region recessed in the axial direction with respect to the first arcuate surface region. As the camshaft rotates, the closeness of the position sensor to the first arcuate surface region and the relative greater distance of the sensor to the second arcuate surface region produces different effects so that the sensor can detect the camshaft's angular position.

1 Claim, 2 Drawing Sheets

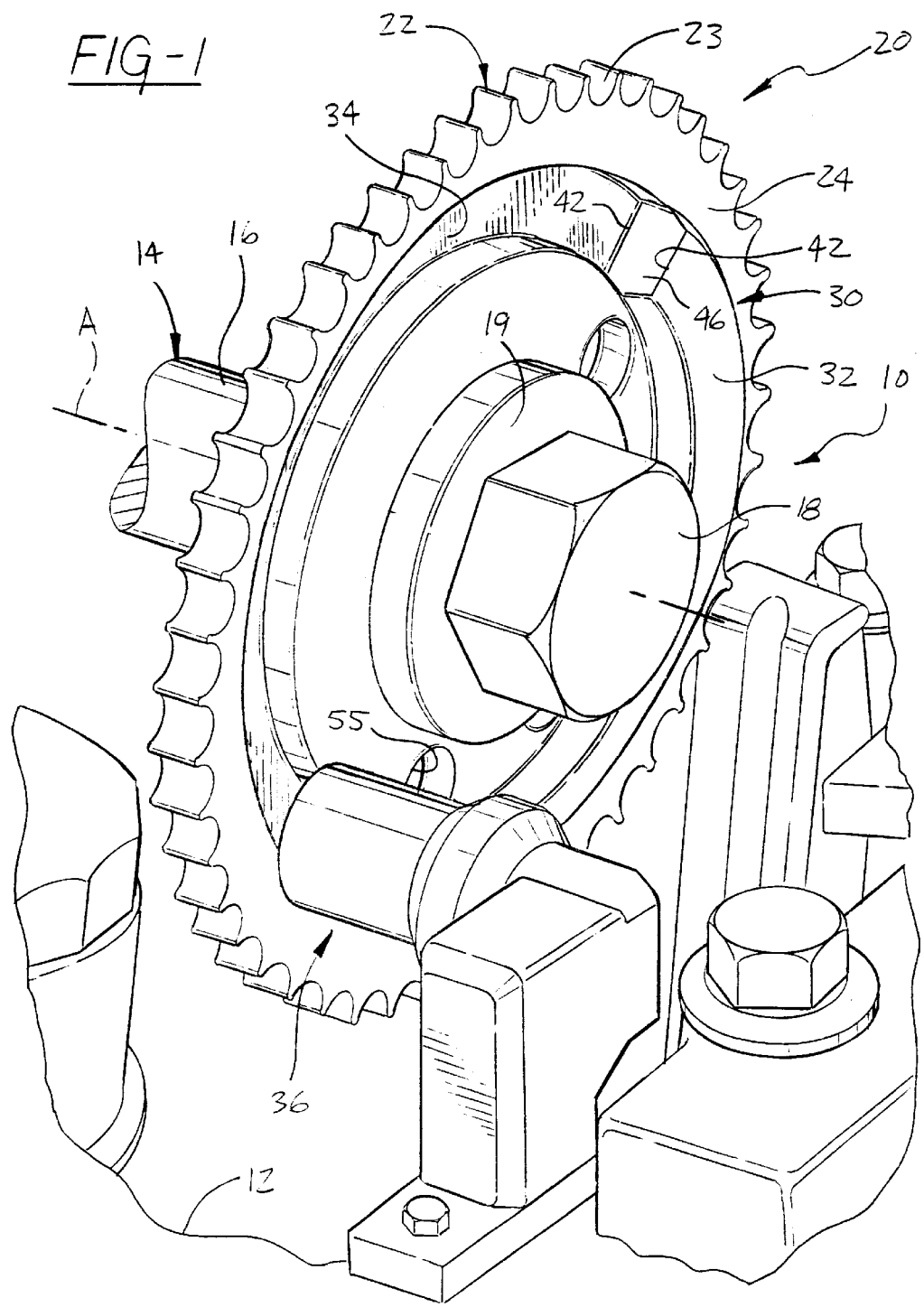

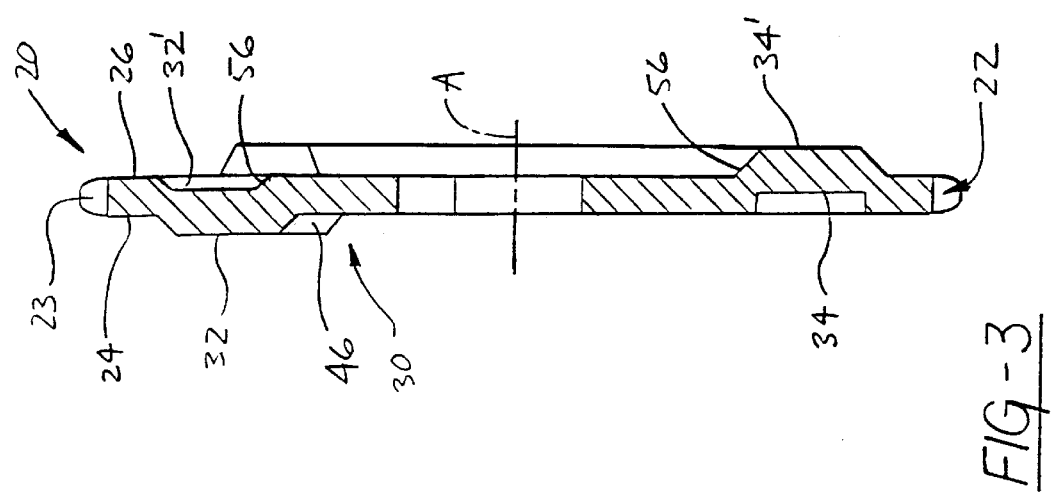
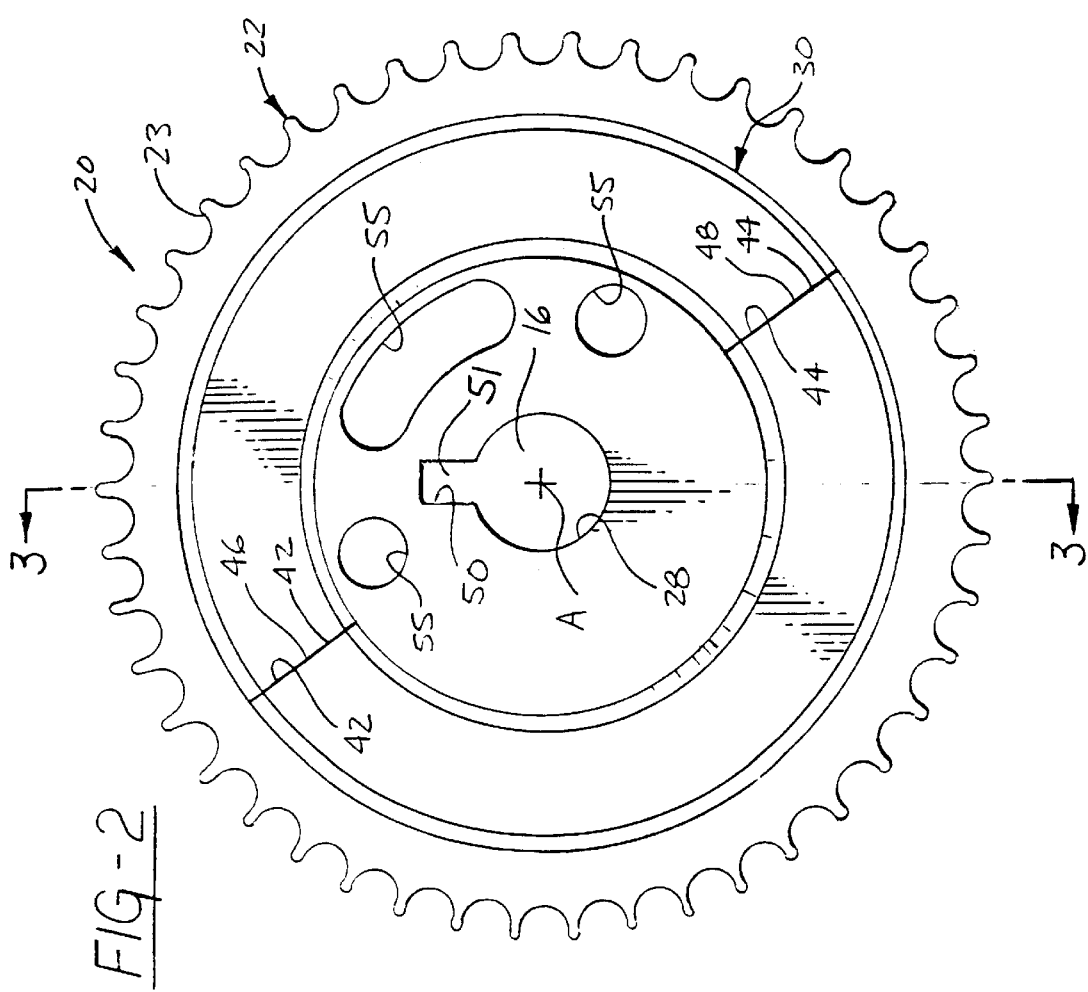

THIN PROFILE CAM SPROCKET WITH INTEGRATED TIMING TARGET

BACKGROUND OF THE INVENTION

1. Field of the Invention

This invention relates to a timing assembly for an internal combustion engine. More specifically, this invention relates to a camshaft sprocket for use with a position sensor to indicate the angular position of a camshaft.

2. Description of the Prior Art

A typical internal combustion engine has an engine block with a plurality of cylinders each having a reciprocally movable piston disposed therein which defines a combustion chamber. The engine block supports a crankshaft interconnected by connecting rods to the pistons so that as the pistons move linearly within the cylinders they produce rotation of the crankshaft. The engine also includes at least one camshaft which is supported so as to actuate valves that control flow of air, fuel and exhaust to and from the combustion chambers. Sprockets are attached to the ends of the crankshaft and the camshaft(s) and a timing belt or chain interconnects the crankshaft to the camshaft(s). The diameter of the crankshaft sprocket is half the diameter of the camshaft sprocket so that for every two full rotations of the crankshaft the camshaft rotates once. The timing belt or chain ensures that the camshaft rotates properly to actuate the valves at the appropriate time in relation to the position of the pistons.

Modern engines utilize computer control and various sensors to control engine functions such as ignition timing and fuel injection operation. These sensors relay information to the computer for processing and then transmitting commands to the devices to control various aspects of engine operation, such as fuel injection and ignition park timing. Typically, the computer coordinates these devices by referencing the position of a particular piston, or triggering piston, specifically when it attains a top dead center position within its cylinder (TDC). The timing of the engine in relation to the piston's position is critical in maintaining efficient engine operation and controlling engine emissions.

Many types of sensors for computer control have been employed to track the angular position of an engine crankshaft and camshaft(s) for timing purposes. Specifically, sensors have been employed to detect the position of the camshaft sprocket attached to one end of the camshaft, which position correlates to the position of the piston because of its connection to the crankshaft by the timing belt or chain. However, this configuration has proven to be problematic from a packaging standpoint due to the very limited space constraints of a modern engine and its associated vehicle.

SUMMARY OF THE INVENTION AND ADVANTAGES

The present invention provides a timing assembly for use with an internal combustion engine. The engine has a shaft support structure for a camshaft and provides a timing assembly at an end of the camshaft which has an axis of rotation. A camshaft sprocket is attached to the one end of the camshaft coaxially therewith and has radially extending teeth thereon. The sprocket has a first end surface extending perpendicularly to the camshaft's axis of rotation. A position sensor, preferably a Hall effect type sensor, is attached to the camshaft support structure adjacent to the first surface. An annular timing surface configuration is located on the first surface and is spaced radially from the axis of rotation. The annular timing surface configuration includes a first arcuate region extending outwardly from the first surface and a second arcuate region recessed with respect to the first region. This produces a step between the two regions. Another way to produce a step would be by providing a projection or a recessed portion. The annular timing surface configuration is axially spaced from the position sensor such that the sensor detects the angular position of the sprocket when the step region is encountered. This detecting of the step between the first and second arcuate regions corresponds to the TDC of the triggering piston. The complex shape of the integral camshaft sprocket and sensor reading surface configuration is preferably formed of powdered metal. Utilizing this process permits placement of apertures in the sprocket for balancing purposes.

Accordingly, the present invention provides a one-piece, thin profile camshaft sprocket that is easily packaged in tight spaces. Further, the sprocket is light weight and well balanced while providing an effective timing surface configuration for a position sensor to generate a desired signal.

BRIEF DESCRIPTION OF THE DRAWINGS

Other advantages of the present invention will be readily appreciated by reference to the accompanying drawings wherein:

FIG. 1 is a partial perspective view of an internal combustion engine utilizing the camshaft sprocket of the present invention;

FIG. 2 is a front view of the camshaft sprocket of the present invention; and

FIG. 3 is a cross-sectional view of the camshaft sprocket taken along line 3—3 in FIG. 2.

DETAILED DESCRIPTION OF THE PREFERRED EMBODIMENT

Referring to FIG. 1, a shaft drive and timing assembly 10 is adapted for use with an internal combustion engine. As mentioned above, the engine has a piston disposed within a cylinder with a top dead center position. The timing assembly 10 has a support structure 12 in the form of a cylinder head, an engine block, a bracket, or another supporting structure, or any combination thereof. A shaft 14 is supported by the support structure 12 at an end 16 thereof and has an axis of rotation A. A radially toothed or sprocket member 20 is mounted to the end 16 of shaft 14 coaxially by a fastener 18 and washer 19 or any other means which will prevent relative movement therebetween. Sprocket 20 has a plurality of radially extending teeth on its circumference. In the preferred embodiment, the shaft 14 is a camshaft.

The sprocket 20 has a center defining the axis of rotation and an outer perimeter 22 spaced radially from the axis of rotation A. A plurality of radially extending teeth 23 are formed about its circumference. A timing chain (not shown) engages the teeth 23 and similar teeth on an associated crankshaft sprocket (not shown) to connect the two sprockets so that the crankshaft rotationally drives the camshaft. The sprocket 20 also has a first end 24 and an opposite second end 26 as best seen in FIG. 3. The surfaces forming ends 24, 26 are generally parallel to one another and bounded by outer perimeter 22. The end surfaces 24, 26 are generally perpendicular to the axis of rotation A. A hole 28 extends through the sprocket 20 for receiving fastener 18.

The cam shaft sprocket 20 has an annular timing surface portion 30 formed on the first end 24 which is interposed between the axis of rotation A and the outer perimeter 22 of the sprocket 20. The annular timing face 30 includes a first arcuate region 32 which is axially extended away or outwardly from the first end surface 24 and a second arcuate region 34 which is axially recessed from the first end surface 24. This creates a step in the axial direction which could also be produced by the use of a recess alone or by a raised surface alone.

Referring again to FIG. 1, a position sensor 36 is attached to the support structure 12 and is adjacent to and slightly spaced from the first end surface 24. Preferably position sensor is a Hall effect type sensor which is commonly used to detect an angular position of a rotating member made of magnetic material and having a surface adjacent the sensor with peaks and valleys. Hall effect type sensors generate a signal that varies depending upon the proximity of the magnetic material from the sensor. That is, as a magnetic object, such as iron or steel, moves closer to the sensor, the sensor's ability to produce an input increases. Conversely, as the magnetic object moves away from the sensor, the sensor's ability to produce an input decreases. As peaks and valleys in the surface of the moving member pass by the sensor, a high or a low signal is produced.

The sensor 36 detects an angular position of the sprocket 20 at a specific radial position corresponding to the change between the first arcuate region 32 and the second arcuate region 34. The first 32 and second 34 arcuate regions are contiguous with one another and include first 42 and second 44 arcuate end portions that are adjacent one another and form first 46 and second 48 steps, respectively. The surface forming steps 46, 48 extend substantially perpendicular to the arcuate regions 32, 34 which ensures that the change in the signal as the step passes by the sensor 36 is pronounced and easily processed by a controller. As a result of the flat Fate regions 32, 34 and the subsntially perpendicular steps 46, 48, a square wave output signal is produced.

In a four stroke engine, commonly used in automobile vehicles, there are two rotations of the crankshaft for an engine cycle. As previously explained, the crankshaft sprocket must rotate twice for each complete rotation of the camshaft sprocket. Therefore, the triggering piston reaches its TDC position twice in each engine cycle and the associated camshaft rotates once in this cycle. Because of these four stroke engine characteristics, each of the arcuate regions extend 180 degrees or half the circumferentially distance. The steps 46, 48 are positioned to determine the angular position of the camshaft. To this end, the sprocket 20 is attached onto the end of the camshaft 16 so that one or the other of steps 46, 48 is adjacent sensor 36 when the triggering piston, typically piston #1, is at TDC. In this manner, the steps 46, 48 and sensor 36 produce a signal that coordinates the engine controller with reference to the position of the triggering piston. Although first and second arcuate regions 32, 34 are shown, it is to be understood that the timing surface configuration 30 may include any number of arcuate regions. Further, the arcuate regions may be spaced in any desired configuration.

Referring to FIG. 2, the sprocket 20 includes a central bore 28 therethrough coaxial with the axis of rotation A and with a locating notch 50 extending radially outwardly from the bore 28. A protuberance 51 extending between the sprocket and the camshaft end cooperates with the locating notch 50 to prevent relative rotation and establishes a desired position of the sprocket with respect to the camshaft. The sprocket 20 also includes at least one balancing aperture 55 extending therethrough. Desired placements of the aperture(s) 55 ensures that the sprocket 20 is dynamically balanced. Moreover, apertures 55 act to remove material from the sprocket 20 and thereby desirably reduce its weight. Apertures 55 may also be of use during the assembly of the engine.

Referring now to FIG. 3, the first arcuate surface region 32 is extended outwardly in the axial direction from the first end surface 24 and its opposite side 32' is recessed inwardly in the axial direction from the second end surface 26. The second arcuate surface region 34 is recessed inwardly in the axial direction from the first end surface 24 and its opposite side 34' is extended outwardly in the axial direction from the second end surface 26. Thus, the configuration of the second end surface 26 is the compliment to the first end surface 24. This enhances the ability to lighten the sprocket 20 and to produce a narrower profile or thickness than if the entire second end surface 26 were flat. First and second arcuate end surface regions 32, 34 also include draft angles, typically illustrated in one location by numeral 56. Draft angles 56 reduce the concentration of stresses and permit the sprocket 20 to be more easily formed from powdered metal into a one-piece member of nearly final dimension, or "near net shape." It is to be understood that the timing surface 30 of the preset invention may also be applied to a gear or any other rotational drive apparatu for an internal combustion engine.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An internal combustion engine with a camshaft drive apparatus having an integral timing target, comprising:

a support structure for the camshaft and position sensor;

said camshaft drive having a first end extending perpendicularly to said camshaft's axis of rotation;

said first end defining an annular timing surface including a first arcuate region and a second arcuate region;

said first arcuate region extending in an axial direction outwardly from said second arcuate region;

a position sensor carried by said support structure and positioned adjacent to said first end; said first arcuate region being more closely spaced from said sensor than said second acuate region wherein said position sensor detects a difference in spacing from said first and second arcuate regions; and said camshaft drive having a second end defining a second end surface extending parallel to said timing surface on said first end, and wherein said second end has a first arcuate region formed outwardly in an axial direction with respect to said second end and said second arcuate region formed inwardly in an axial direction with respect to said first arcuate region.

* * * * *